United States Patent [19]

Grant

[11] Patent Number: 5,600,060
[45] Date of Patent: Feb. 4, 1997

[54] APPARATUS AND METHOD FOR COMPUTING UNSTEADY FLOWS BY DIRECT SOLUTION OF THE VORTICITY EQUATION

[75] Inventor: John R. Grant, Jamestown, R.I.

[73] Assignee: The United States of America as represented by the Secretary of the Navy, Washington, D.C.

[21] Appl. No.: 613,747

[22] Filed: Feb. 22, 1996

[51] Int. Cl.$^6$ .................................................. G01M 9/00
[52] U.S. Cl. ........................................................ 73/147
[58] Field of Search ......................... 73/147, 178 R, 73/178 T, 861.22, 861.23, 861.24, 195, 196; 137/804; 346/1, 107, 135

[56] References Cited

U.S. PATENT DOCUMENTS

| | | | |
|---|---|---|---|
| 3,787,874 | 1/1974 | Urban | 346/1 |
| 4,727,751 | 3/1988 | Holmes et al. | 73/147 |
| 5,544,524 | 8/1996 | Huyer et al. | 73/147 |

*Primary Examiner*—Richard Chilcot
*Assistant Examiner*—William L. Oen
*Attorney, Agent, or Firm*—Michael J. McGowan; James M. Kasischke; Prithvi C. Lall

[57] ABSTRACT

Fluid flow characteristics are calculated directly from a two dimensional surface model of the object. A plurality of surface nodes with defined boundary conditions are established on the surface model. Consecutive layers of nodes are created a preset distance outward from said surface model. Curved panels are defined passing through three nodes at a layer, and a surface shape function is established for each panel from previous panels or from the boundary conditions. The fluid flow velocity for the next layer is developed from the velocities calculated at the previous layer and the shape function. Triangular elements are created by connecting a node on the next layer with two nodes from the previous layer to form an element. First and second vorticity gradients can be calculated for the current node at a time segment from the parameters associated with the previous layer of interest nodes at that time increment. This can be combined with the calculated diffusion velocity for the node to produce a rate of change of vorticity with respect to time which can be used to calculate the velocity of the fluid at the node.

9 Claims, 4 Drawing Sheets

APPARATUS AND METHOD FOR COMPUTING UNSTEADY FLOWS BY DIRECT SOLUTION OF THE VORTICITY EQUATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention generally relates to the analysis of fluid flow past an object having a complex geometry and more particularly to a method and apparatus for calculating two-dimensional unsteady flows past such an object by direct solution of the vorticity equation on a triangularized Lagrangian mesh.

2. Description of the Prior Art

Understanding the characteristics of fluid as it flows past an object, such as an airfoil, is important both from the standpoint of understanding and improving the designs of such objects and in understanding the nature of any turbulence introduced as a result of relative motion of a fluid an airfoil, either by moving of the airfoil through the fluid or by moving the fluid past the airfoil.

In the past understandings of fluid flow have been derived from the observation of fluid flow past a model and by specific measurements. For example, U.S. Pat. No. 3,787,874 to Urban discloses a method for making boundary layer flow conditions visible by applying to the surface of a moving or stationary structural body to be exposed to the flow a reactive layer of at least one chemical color indicator, such as a cholesterinic liquid. The body is exposed to a flow of gas, such as air, which contains a reagent. The chemical color indicator can also be applied together with gelling means and a moisture binder. The chemical color indicator can also be absorbed by a high-contrast, absorbent paper which is then applied to the body. A metal or plastic foil coated with a binder and/or indicator can also be used for this purpose. A boundary layer flow pattern image is produced, which can subsequently be recorded. Other prior art patents follow this approach.

U.S. Pat. No. 4,727,751 discloses a mechanical sensor for determining cross flow vorticity characteristics. This sensor comprises cross flow sensors which are non-invasively adhered to a swept wing laminar surface either singularly, in multi-element strips, in polar patterns or orthogonal patterns. These cross flow sensors comprise hot-film sensor elements which operate as a constant temperature anemometer circuit to detect heat transfer rate changes. Accordingly, crossflow vorticity characteristics are determined via cross-correlation. In addition, the crossflow sensors have a thickness which does not exceed a minimum value in order to avoid contamination of downstream crossflow sensors.

These prior art approaches present visualizations or measurements that define certain aspects of the characteristics of fluid flow. However, they are designed primarily to determine characteristics at a boundary layer or some other localized site. Each requires the production of a physical model and physical testing of such models. Moreover, if the testing suggests any change to the shape of an airfoil, it is generally necessary to modify the physical model and run the tests again in order to validate any change. Such testing can become time-consuming and expensive to perform.

More recently, it has been proposed to utilize computer modeling techniques to produce such fluid flow analyses. Such computer modeling is attractive because it eliminates the need for physical models and holds the opportunity to reduce testing, particularly if design changes are made to an object undergoing test. Initially such techniques were applied to circular cylinders using a small number of discrete point vortices.

Eventually additional studies determined that vorticity was useful as a basis for understanding fluid flow. Vorticity is produced at a solid boundary because at the surface the fluid has no velocity (i.e., the fluid exhibits a no-slip condition). Once generated at the surface, vorticity diffuses into the volume of the fluid where it is advected by local flow. Conventional vortex methods generally mime this process. In accordance with such methods, the strengths of the vortex elements or segments originating on the body surface are determined by requiring that the velocity induced by all the vortex elements on the surface be equal and opposite to the velocity at the surface. It is assumed that this vorticity is contained in an infinitely thin sheet at the surface. In these methods a resulting matrix equation is solved for the surface vorticity at all points on the body simultaneously. Vorticity transfer to the flow is then accomplished by placing the vortex elements above the surface.

It has been recognized that these vortex methods have several shortcomings. When computational methods use point vortices in their simulations, mathematical singularities can produce divergent solutions. This has been overcome by using a kernel function that contains a regularized singularity. However, this kernel function depends on certain ad hoc assumptions such as the value of the cutoff velocity and core radius. While the no-slip and no-flow boundary conditions provide information regarding the strength of the surface vorticity and subsequent strength of the vortex element, their use often neglects the effects of all other vortex sheets on the surface. Other implementations of such methods neglect the effects of coupling between the surface vortex sheets and surface sources. Finally, many methods assume a priori a separation point to analyze shedding of vorticity from the surface into the flow that generally requires experimental knowledge of the flow.

More recent prior art has utilized computer modeling based upon the nature of vortex elements at the surface of an object, such as an airfoil. These models then track the motion of each element as it moves into the flow over time to calculate the velocity of each element. While this prior art produces acceptable results, the direct calculation of the velocity of each vortex element produces an $N^2$ increase in the required time for processing where N is the number of vortex elements for each time step. Such increases can become unacceptable when high resolution demands the calculation of a large number of vortex elements.

A recent prior art innovation using these computational methods was taught in U.S. patent application, Ser. No. 08/506,583 filed by Grant, Huyer and Uhlman which is incorporated by reference herein. This prior art teaches the use of disjoint elements of compact support in the form of rectangles to describe the vorticity field. These anisotropic elements are created at the surface with the strength determined by the no-slip and no-flux boundary conditions. In this method, the vorticity is taken as uniform over the entire element and the endpoints of the element are advected independently with the area of the element conserved and, therefore, the total circulation.

This technique was applied to an airfoil undergoing both single pitch and oscillatory pitching motions to produce large scale vortex structures. In the former case, calculations of the unsteady flow and unsteady lift and drag forces obtained from surface pressure integrations were in excellent agreement with experimental results. In the case of the oscillating airfoil, however, poor agreement was found as the flow field dynamically reattached. The most likely reason is the use of random walk to model diffusive effects. Use of this algorithm is required because disjoint elements are not connected to one another.

SUMMARY OF THE INVENTION

Therefore, it is an object of this invention to provide an improved method and apparatus for predicting the flow of fluid past an object that minimizes the assumptions used in the predictions.

Another object of this invention is to provide an improved method and apparatus for predicting the flow of fluid past an object for a large number of points in an area of interest thereby to provide maximum resolution for the prediction.

Yet another object of this invention is to provide a method wherein vorticity is specified at nodal locations and the vorticity field can be obtained between nodal locations by linear interpolation via triangulation.

In accordance with a method and apparatus of this invention fluid flow characteristics are calculated directly from a two dimensional surface model of the object. A plurality of surface nodes with defined boundary conditions are established on the surface model. Consecutive layers of nodes are created a preset distance outward from said surface model. Curved panels are defined passing through three nodes at a layer, and a surface shape function is established for each panel from previous panels or from the boundary conditions. The fluid flow velocity for the next layer is developed from the velocities calculated at the previous layer and the shape function. Triangular elements are created on the first time step by connecting a node on the next layer with two nodes from the previous layer to form an element. First and second vorticity gradients can be calculated for the current node at a time segment from the parameters associated with the previous layer of interest nodes at that time increment. This can be combined with the calculated diffusion velocity for the node to produce a rate of change of vorticity with respect to time which can be used to calculate the velocity of the fluid at the node. For subsequent time segments, the nodes are advected and triangles are created by connecting nodes so that the angles of each triangle are a maximum.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
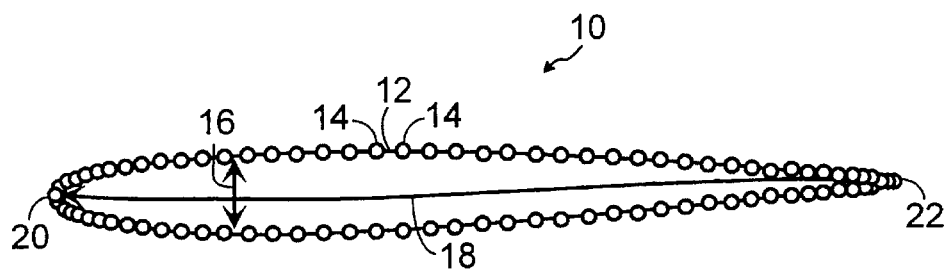
FIG. 1 represents a line segment representation of an airfoil cross-section.

FIG. 1 depicts a surface 10 of a standard foil, such as an airfoil or hydrofoil, constructed by connecting line segments 12 between adjacent body points 14. This particular airfoil is symmetrical in cross section and has a maximum airfoil section thickness 16 that is 15% of the length of its chord 18. The airfoil chord length has a non-dimensional length of 1.0. Body points 14 are clustered near the leading edge 20 and trailing edge 22 of the surface 10 to better resolve the flow at those locations.

Figure 4A:
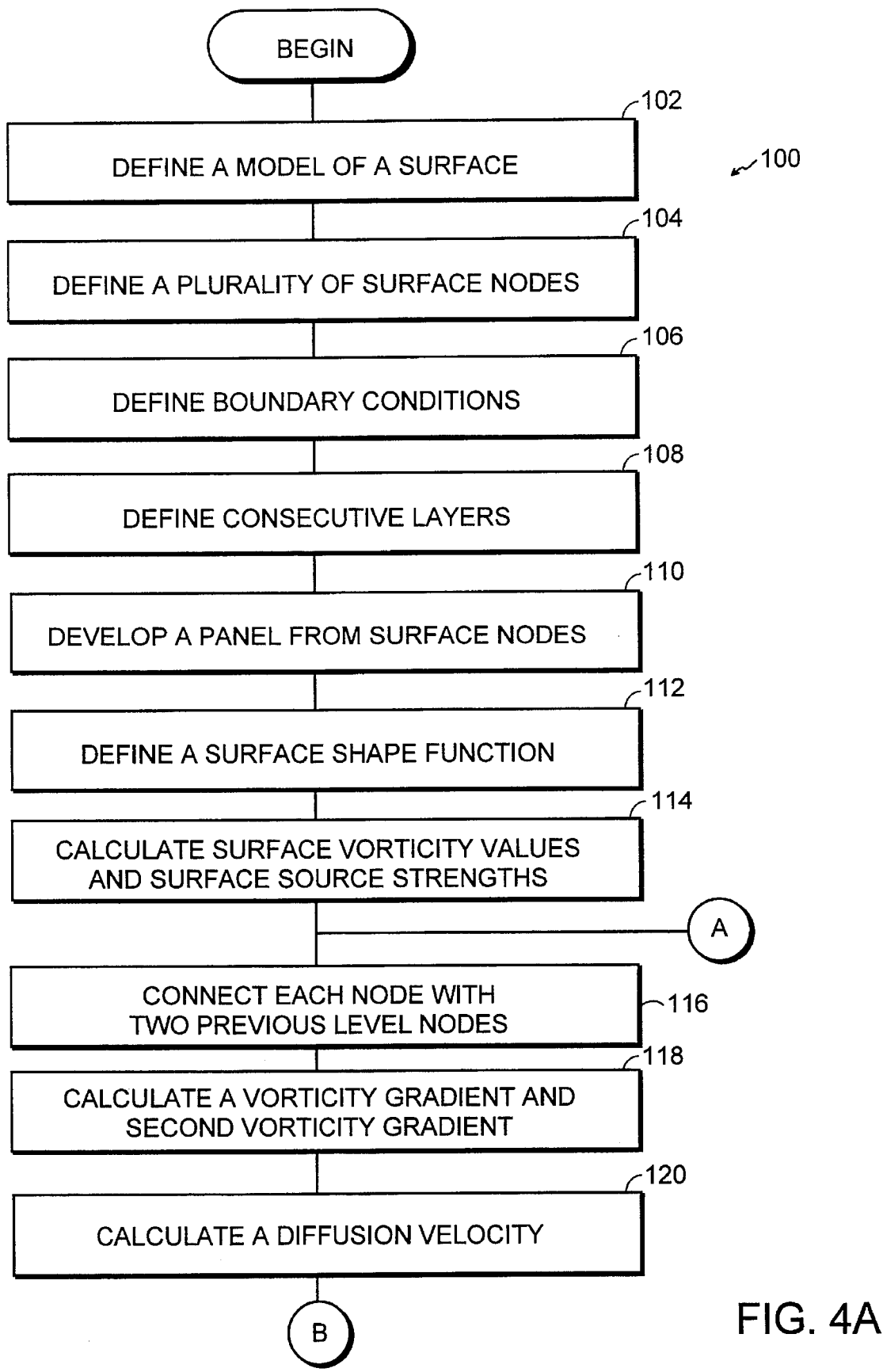
FIG. 4A and FIG. 4B provides flowchart depicting the inventive method.
Figure 4B:
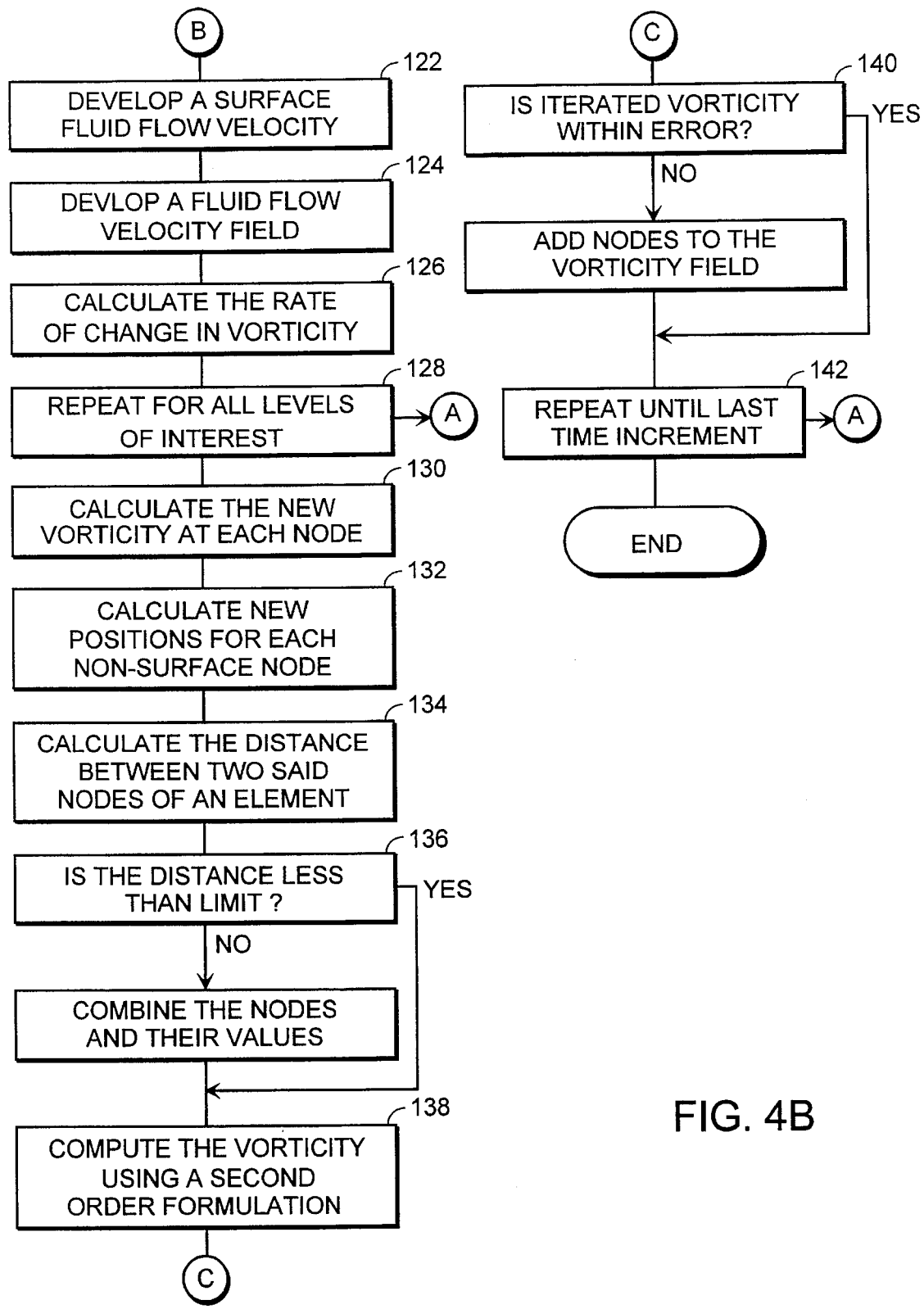

FIG. 4A and FIG. 4B provide a flowchart 100 which will be referenced through out this description. The steps of developing a surface model are shown in FIG. 4A as steps 102 and 104. It will apparent that similar models can also be produced to represent objects with other cross-sectional shapes.

Figure 2:
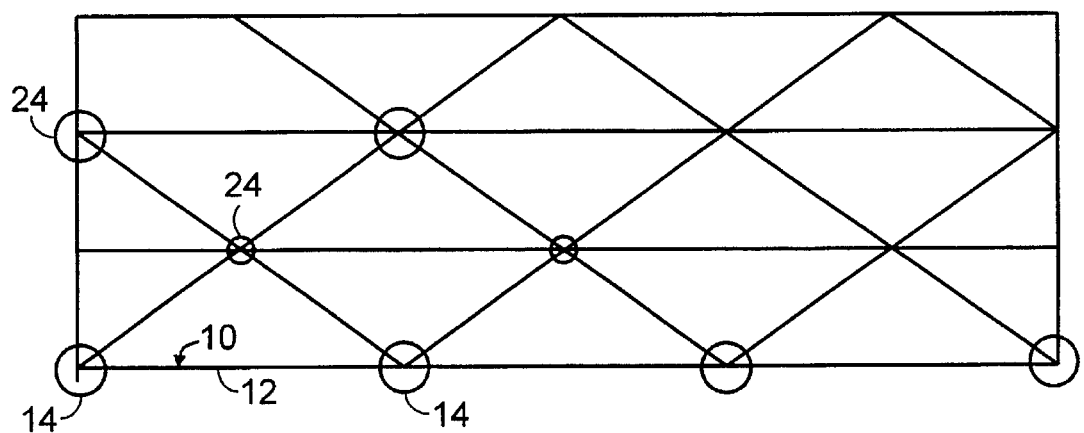
FIG. 2 represents triangular vorticity elements intersecting a plurality of surface nodes.

FIG. 2 depicts the triangular Lagrangian grid constructed in step 108 of flowchart 100 on body or nodal points 14 on surface 10. As will be discussed later, the vorticity amplitudes are specified at points 14 on surface 10 and allowed to diffuse to field points 24. Field points 24 are positioned in layers above surface 10. The distance above the surface of each layer of nodes is proportional to a diffusion length scale, $d_l$, calculated as follows:

$$d_1 = \sqrt{4v\Delta t} \qquad (1)$$

where $v$ is the viscosity of the fluid and $\Delta t$ is the size of the time step. Each layer should be separated by a distance of $0.5(d_l)$.

Each point 14 effectively carries two velocity generators: a surface vorticity and a potential source distribution. The sources are needed, mathematically, to prevent penetration of the nodal points 14 into the surface 10 and to ensure that both no-slip and no-flux boundary conditions are satisfied. As established in step 106, the no-flux boundary condition means that nothing flows through surface 10, and the no-slip boundary condition that the fluid velocity at the surface is zero. It has been shown in the prior art that as the number of surface points 14 increase, the strengths of the sources approach zero. The sources are therefore a result of the finite discretization of the surface vorticity distribution.

Figure 3:
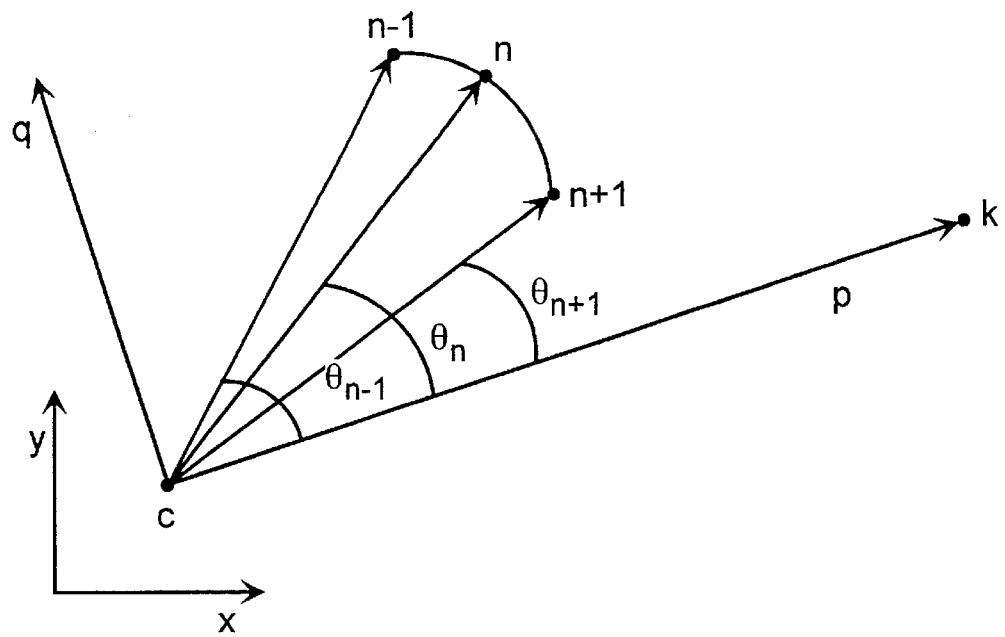
FIG. 3 depicts the surface source geometry.

Referring now to FIG. 3 showing the source panel geometry. Non-singular source panels were developed in order to compute the source velocities at the nodal points. Polar coordinates (r,θ) are used with radial and tangential velocities computed at the nth surface nodal coordinate. This is step 110 on FIG 4A. Three consecutive points, n−1, n and n+1, are required to determine the radius of a circle and the circle centroid, c at $(x_c, y_c)$. The velocity $\vec{I}(\vec{x})$ at a field point, k at $(x_k, y_k)$, is determined by the following integral:

$$\vec{I}(\vec{x}) = \int_c f(s) \frac{(\vec{x} - \vec{x}'(s))}{|\vec{x} - \vec{x}'(s)|^2} ds \qquad (2)$$

where s is the coordinate relative to the surface in the local coordinate system, $\vec{x}$ is the global position coordinates, $\vec{x}'(s)$ is the tile position coordinates, and f(s) is the surface shape function. The surface shape function, f(s), is a curve chosen such that: f(n)=1.0, f(n+1)=0.0, and f(n−1)=0.0. When the curve is summed over adjacent points n and n+1 its value should be 1.0. The shape function is chosen in step 112 of FIG. 4A. Thus, in polar coordinates, the integral of equation (2) can be evaluated along θ for:

$$f(\theta) = \frac{\sin(\theta_{n+1} - \theta)}{\sin(\theta_{n+1} - \theta_n)}, \quad \theta_n \leq \theta \leq \theta_{n+1} \tag{3}$$

$$= \frac{\sin(\theta - \theta_{n-1})}{\sin(\theta_n - \theta_{n-1})}, \quad \theta_{n-1} \leq \theta \leq \theta_n \tag{4}$$

where θ is defined in the local coordinate system. The local coordinate system is chosen so that $\hat{p}$ lies along $\vec{x} - \vec{x}_c$. Accordingly the unit vectors are:

$$\hat{p} = \frac{\vec{x} - \vec{x}_c}{|\vec{x} - \vec{x}_c|}, \quad \hat{q} = \hat{z} \times \hat{x} \tag{5}$$

This has the advantage that the local normal coordinate of the field point, q, equals zero. Thus the integral of equation (2) expressed in local polar coordinates is:

$$\vec{I}_n = \hat{p}R \int_{\theta_{n-1}}^{\theta_{n+1}} f(\theta) \frac{(p - R\cos\theta)}{p^2 + R^2 - 2Rp\cos\theta} d\theta - \tag{6}$$

$$\hat{q}R^2 \int_{\theta_{n-1}}^{\theta_{n+1}} f(\theta) \frac{\sin\theta}{p^2 + R^2 - 2Rp\cos\theta} d\theta.$$

Upon transformation back to the global coordinate system this integral, equation (6), becomes:

$$\vec{u}(\vec{x}) = -\frac{1}{2\pi} \sum_{n=1}^{N} \sigma_n \vec{I}(x)_n \tag{7}$$

where $\sigma_n$ are the source amplitudes for node n of a body defined by N points. There are N equations produced for the N surface vorticity values. For a body defined by N points, there are then 2N unknowns. Requiring the total velocity (that due to the surface source distribution and the field vorticity) to be zero at each surface node produces an equivalent number of equations. These equations are calculated in step 114. However, the integral of vorticity over a bounded volume is zero when the velocity vanishes on the bounding surface (no-slip condition). This constraint is written as follows:

$$\frac{1}{3} \sum_{n=1}^{N} \Omega_n \sum_{m=1}^{M} A_m = 0 \tag{8}$$

where $\Omega_n$ is the vorticity amplitude of element n, $A_m$ is the area of element m, N is the total number of elements, and M is the total number of elements which intersect the surface node, n. The equation is multiplied by ⅓ to obtain the average vorticity for the three nodal vorticity amplitudes from a triangle.

Circulation about the body can be generated by the instantaneous vorticity distribution in the boundary layer. Similarly, the integral of the surface potential source, $\sigma_n$, over the body surface is zero by continuity. This constraint is expressed as:

$$\frac{1}{2} \sum_{n=1}^{N} \sigma_n R_n(\theta_{n+1} - \theta_{n-1}) = 0 \tag{9}$$

where $\sigma_n$ is as above, $R_n$ is radius from centroid of the coordinate system, c to the node n, and $\theta_{n+1}$ and $\theta_{n-1}$ the angular measurements to adjacent nodes, n+1 and n−1. The combined $R_n$–θ term being a representation of the arc length. The factor of ½ for the source summation is effectively due to the average over the two arc lengths inclusive of node n. Because of these constraints (one source, one direction of vorticity), this set of 2N+2 equations is an over determined set. The matrix solution for the surface strengths is formulated via Lagrange multipliers so that the integral constraints are met exactly and the 2N boundary conditions on velocity are satisfied in a least squares sense. The deviation from zero of the velocity at the control points has always been found to be slight; maximum values of this deviation for the computations described below are of order $10^{-3}$ times the freestream velocity.

In the present method, nodal vorticity values are known or computed and a linear variation of vorticity between all nodal points is assumed. This allows for determination of vorticity at any point in the field. At each time step, Delaunay triangularization routines are used to form an unstructured mesh connecting each nodal point as in step 116 thus forming triangular elements. These triangular elements are constructed with the largest possible interior area.

Figure 5:
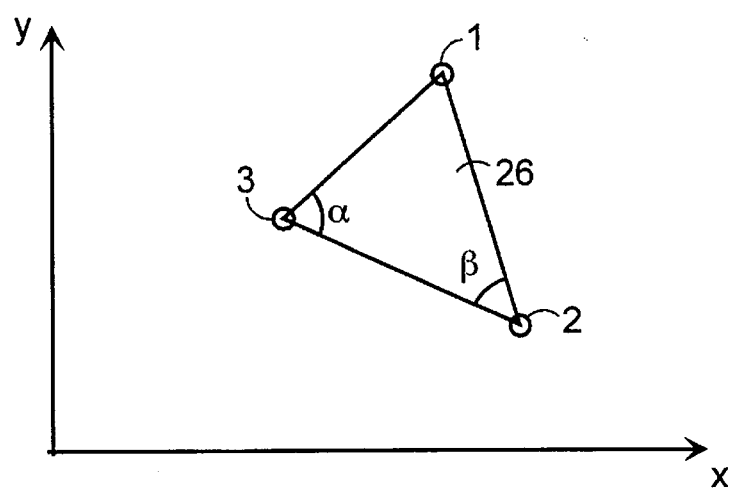
FIG. 5 depicts the geometry of a surface vorticity segment useful in understanding this invention.

Referring now to FIG. 5, there is shown a single triangular element 26 with nodes 1, 2 and 3 with vertices located at $(x_1, y_1)$, $(x_2, y_2)$, and $(x_3, y_3)$. Element 26 is constructed to maximize angles α and β. Then, in area coordinates:

$$N_1 = (a_1 + b_1 x + c_1 y)/2\Delta \tag{10}$$

$$N_2 = (a_2 + b_2 x + c_2 y)/2\Delta \tag{11}$$

$$N_3 = (a_3 + b_3 x + c_3 y)/2\Delta \tag{12}$$

where: Δ is the triangle area $$a_1 = x_2 y_3 - x_3 y_2 \tag{13}$$

$$b_1 = y_2 - y_3 \tag{14}$$

$$c_1 = x_3 - x_2 \tag{15}$$

Values for a, b, and c are evaluated similarly for nodes 2 and 3. The shape function values $N_1$, $N_2$, and $N_3$ are then 1.0 at their respective nodes and 0 at each of the other two nodes. The vorticity ω over the element can then be expressed as:

$$\omega = \Omega_1 N_1 + \Omega_2 N_2 + \Omega_3 N_3 \tag{16}$$

The velocity from the Biot-Savart integral is then:

$$\vec{u}(\vec{x}) = \frac{1}{2\pi} \int_c \vec{\omega}(\vec{x}') \frac{(\vec{x} - \vec{x}')}{|\vec{x} - \vec{x}'|^2} dA \tag{17}$$

Using integration by parts, this integral is split into two parts:

$$\vec{u}(\vec{x}) = -\frac{1}{2\pi} \left( \oint_c \vec{\omega}(\vec{x}') \times \hat{n}(\vec{x}) \ln|\vec{x} - \vec{x}'| d\Gamma + \int_A (\vec{\nabla}' \times \vec{\omega}(\vec{x}')) \ln|\vec{x} - \vec{x}'| dA \right) \tag{18}$$

The area integral can be expressed:

$$\vec{u}_A(\vec{x}) = \left( \sum_{k=1}^{3} \frac{|\Omega_k|}{4\pi A} ((x_{k+1} - x_{k-1})\hat{x} + (y_{k+1} - y_{k-1})\hat{y}) \right) E(\vec{x}, s) \tag{19}$$

where $E(\vec{x}, s) = \int_A \ln|\vec{x} - \vec{x}'| dA$

The circuit integral can be evaluated over each leg of the triangle resulting in a summation of the form:

$$\vec{u}_c(\vec{x}) = -\frac{1}{2\pi} \sum_{k=1}^{3} \hat{n}_k \times G(\vec{x}, \eta) \tag{20}$$

-continued where $$G(\vec{x},\eta) = \int_{\eta_k^-}^{\eta_k^+} (\Omega_{k-1}N_{k-1}(\vec{x}'-\vec{x}) + \Omega_k N_k(\vec{x}'-\vec{x}))\ln|\vec{x}-\vec{x}'|d\eta' \quad (21)$$

where η is defined as the segment from the $k-1^{th}$ node to the $k^{th}$ node.

Both the area and the circuit integrals were evaluated analytically. An interesting aspect of these integrals can be seen from their form. The area integral effectively expresses the velocity due to the average of the three nodal vorticity values. The circuit integral accounts for effects of the linear variation of the nodal vorticity values. Hence, if the vorticity is constant over the element, the circuit integral is zero and the only contribution to the velocity is from the area term.

Since the vorticity is assumed to vary linearly over the element, the first derivatives will be constant over a single element and the second derivatives will be zero. A more accurate way to compute the derivatives was desired. It was found that the most accurate way to express first and second order spatial derivatives across scattered points was to construct a least squares solution for all the triangles which intersect a given node. This is accomplished by expressing the vorticity about a desired node as:

$$\omega = ax + by + cx^2 + dy^2 + exy \quad (22)$$

where x and y are referenced to the local node. Then, as calculated in FIG. 4A, step 118, at a given nodal point (x=y=0):

$$\frac{\partial \omega}{\partial x} = a, \frac{\partial \omega}{\partial y} = b \quad (23)$$

$$\nabla^2 \omega = \frac{\partial^2 \omega}{\partial x^2} + \frac{\partial^2 \omega}{\partial y^2} = 2.0(c+d) \quad (24)$$

In inviscid flow, vorticity is transported by the velocity field in the same way as a material element. This type of flow is thus very well suited to Lagrangian mesh formulations, where the mesh points are transported by the velocity field. However, when vorticity is transported by means other than advection by the velocity field, some accounting must be made for this transport in the mesh point distribution. Such is the case for viscous fluids, which transport vorticity via diffusion as well as advection. Rather than introducing new 'empty' points into the mesh onto which vorticity may diffuse, the inventive method transports the existing mesh points with the sum of a diffusion velocity and the usual flow velocity. Thus the mesh points tend to move from regions of large vorticity magnitude to regions of lesser magnitude, according to the diffusive transport by viscosity.

The concept of diffusion velocity for scalars (as is the vorticity magnitude, the dependent variable for 2D flows) is readily developed. A velocity v is introduced such that the transport vω is the same as the diffusive transport:

$$\vec{v}\omega = -\nu\vec{\nabla}\omega \quad (25)$$

Thus for scalars the diffusion velocity of step 120 is $$\vec{v} = -\frac{\nu}{\omega}\vec{\nabla}\omega = -\nu\vec{\nabla}(\ln\omega) \quad (26)$$

Now replacing the diffusive flux in the vorticity equation by the product vω, yielding:

$$\frac{\partial \omega}{\partial t} + \vec{u}\cdot\vec{\nabla}\omega = -\vec{\nabla}(\vec{v}\omega) \quad (27)$$

However, the new form here can be manipulated to $$\frac{\partial \omega}{\partial t} + (\vec{u}+\vec{v})\cdot\vec{\nabla}(\ln\omega) = \nu\nabla^2\omega + \vec{v}\cdot\vec{\nabla}\omega \quad (28)$$

Thus the same term has been introduced on both sides of the vorticity equation. In the process, though, we have identified the proper diffusion velocity to implement into the solution. That is, the mesh points are transported according to the equation $$\frac{d\vec{x}}{dt} = \vec{u}+\vec{v} \quad (29)$$

and the vorticity evolution on these points is specified by equation (28) used in FIG. 4B, steps 122 and 124. For numerical purposes, as in step 126, a better-behaved form of equation (28) is $$\frac{\partial(\ln\omega)}{\partial t} + (\vec{u}+\vec{v})\cdot\vec{\nabla}(\ln\omega) = \nu\nabla^2(\ln\omega) \quad (30)$$

although care must be taken where ω is very small. The velocity term $(\vec{u}+\vec{v})\cdot\vec{\nabla}(\ln\omega)$ is advected from equation (29); however, $\vec{u}$ is developed in equation (18), $\vec{v}$ is developed in equation (26). The velocity term of equation (28) is subsumed into $\vec{\nabla}(\ln\omega)$. The process is repeated for all layers of interest as shown in step 128.

As the points are continually advected and diffused, the triangles will deform by stretching or compressing. In order to maintain spatial resolution of the vorticity field, a division algorithm was developed. If the vorticity as computed using a second order formulation is greater or less by a factor of 10% compared with the linear formulation, additional nodal points are required to maintain the second order accuracy, as shown at steps 138 and 140. An additional nodal point is then added at the centroid of the triangle. The vorticity at this point is then the average of the vorticity amplitudes at each node of the given side of the triangle. To offer additional control on the number of points in the field, an amalgamation routine can be used. If points become closer than $0.1(d_l)$ ($d_l$ is the diffusion length scale defined in equation (1)), the nodal vorticity values are combined in such a way as to conserve total circulation. This is shown at steps 134 and 136. The method is iterated for successive time increments over the time period of interest as in step 142.

To calculate the overall velocity about object 10, the Grant, Huyer and Uhlman fast multipole method is used as disclosed in U.S. patent application, Ser. No. 08/506,583. To increase the resolution of the surface as well as the flow field, a large set of vorticity elements must be computed. The fast multipole method allows computation of the flow field with an increased number of vorticity elements.

The first step in the fast multipole method is to partition the field domain into square boxes. The locations of the elements are noted, and a square box is defined to encompass all elements in the field. This single box is defined as level 0. The level 0 box is partitioned into four square boxes of equal dimensions defined as level 1. The level 1 boxes are termed the children of level 0 with level 0 being the parent of children at level 1. Each level 1 box has three sibling level 1 boxes. Each of these boxes is partitioned into four square level 2 boxes. They are the children of the parent boxes at level 1. The partitioning of each box at subsequent levels continues until the minimum desired box dimensions are obtained. In order to maintain accuracy, the multipole method taught in the prior art is not computed for neighboring boxes, instead the direct calculation of the current invention is used. A neighboring box is defined as a box which borders on the box containing the elements where the velocities are desired. For a given box, there are a maximum of 9 boxes (including the box itself) where the direct interaction calculation is needed. For practical problems a minimum of 3 box levels is needed to justify the added computational cost of formulating the multipole expansion.

The next step in the derivation is to sum the influence of all the vortices on the velocity field in a given box about the box center. Six point vortices weighted according to the rules of Gauss quadrature are used to represent individual vorticity elements. The velocities may then be expressed as a Taylor series expansion with a set of coefficients and partial derivatives of the velocity kernel function. The coefficients are computed for the parent boxes up to level 2 boxes by translating the expansion of the four child boxes to the parent box. Velocity values at a given point in the field are desired. Therefore, the contributions due to all the boxes in the field are summed (except for the neighboring boxes where the direct calculation is used). This is accomplished by translating the Taylor series expansion from the source to the center of a given box in the field beginning at the coarsest level. The multipole expansion is then computed at finer levels. The final expression for each velocity component has the form:

$$\psi = \sum_{n=0}^{\infty} \sum_{m=0}^{n} B_{n-m,m} h^{n-m} k^m \qquad (31)$$

An expression for the far-field influence of all vorticity elements in terms of a set of coefficients, B, and local coordinates relative to the box center, h, k, for each box in the field was thus formulated.

An examination of the errors due to the fast calculation method were computed. It was found that errors on the order of $10^{-5}$ occurred due to representation of the vortex element by six point vortices. Average and maximum errors were found to be of the order $10^{-4}$ and $10^{-3}$ respectively.

The inventive method incorporating triangularization developed herein addresses many of the shortcomings of the prior art methods. A unique aspect of this method is that vorticity is specified at nodal locations and the vorticity field is linearly interpolated via triangulation at points in between. The surface is non-singular by use of curved panels. By use of triangularization, the induced velocity due to vorticity in the field is non-singular. No explicit assumptions are required as to the vorticity field. This is a significant limitation with most vortex blob methods. The velocity associated with the vorticity field is given by the Biot-Savart law and can be directly integrated to provide an analytic solution. Each of the nodes are advected separately allowing adaptive resolution of the vorticity field. Spatial resolution is maintained by adding additional nodal vorticity points at the centroid of the triangle. This unique method automatically increases resolution of the vorticity field in regions of high shear. The method of constructing derivatives across scattered points allows for direct computation of viscous diffusion. Since diffusion is computed directly, defined Reynolds numbers can now be studied. Satisfaction of the no slip, no flux boundary conditions are stringently satisfied using a matrix set of equations to compute simultaneously the strengths of the surface vorticity sheet and surface sources.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for directly computing unsteady fluid flows comprising the steps of:

defining a model of a surface;

defining a plurality of surface nodes on said surface model;

defining boundary conditions at said surface nodes;

defining consecutive layers a preset distance outward from said surface model, said consecutive layers having nodes therein;

developing a panel for said surface, said panel being an arc intersecting at least three nodes of the previous layer of interest, said surface panel having a centroid and an arc length;

defining a surface shape function in accordance with said boundary conditions at each said surface node;

calculating surface vorticity values and surface source strengths at said surface in order to satisfy said boundary conditions;

connecting a node at a level of interest with two nodes from a previous level of interest to form an element, said previous level of interest nodes being said surface nodes if said level of interest is the initial level of interest;

calculating a vorticity gradient for the level of interest node and a second vorticity gradient from said parameters associated with said two previous layer of interest nodes at said time increment;

calculating a diffusion velocity from said vorticity gradient for the level of interest node at said time increment;

developing a surface fluid flow velocity at said time increment by calculation from said source velocities at said at least three nodes of said surface and said defined shape function;

developing a fluid flow velocity field at said time increment at each said node at said level of interest by calculation from calculated vorticity gradients and diffusion velocities at said connected two nodes at said previous level of interest;

calculating the rate of change in vorticity with respect to time for said each level of interest node at said time increment using said developed velocity, said diffusion velocity and said first and second vorticity gradients;

repeating the steps beginning at the step of connecting a node for the next level of interest until an entire fluid flow velocity field of interest is developed at the time increment;

calculating the new vorticity at each node at the time increment;

calculating new positions for each node at the time increment; and repeating the steps beginning at the step of connecting a node for the next time increment.

2. The method of claim 1 wherein said boundary conditions are no-slip and no-flux.

3. The method of claim 1 wherein said preset distance for said consecutive layers is based on a diffusion length scale, $d_l$, defined as follows:

$$d_l = \sqrt{4\nu\Delta t}$$

where $\nu$ is the viscosity of the fluid and $\Delta t$ is the time increment between steps.

4. The method of claim 3 wherein said preset distance for said consecutive layers is calculated to be $0.5(d_l)$.

5. The method of claim 3 further comprising the steps of:

calculating the distance between two said nodes of said element; and combining the values of said nodes if the distance between them becomes less than a preset fraction of the diffusion length scale, $d_l$.

6. The method of claim 5 wherein the preset fraction of the diffusion length scale is $0.1(d_l)$.

7. The method of claim 1 further comprising the steps of:

computing vorticity at one of said nodes at a time increment using a second order formulation;

comparing said computed second order vorticity for said one node with said vorticity developed by iteration at said time increment to determine an error; and adding nodes to the vorticity field at the centroid of the elements incorporating said one node to maintain second order accuracy when said error exceeds a preset limit.

8. The method of claim 7 wherein said vorticity at said added nodes is the average of the vorticity amplitudes at each node of the element.

9. The method of claim 1 further comprising the steps of:

defining nested boxes about said surface;

directly calculating the vorticity and velocity for nodes in a box of interest and the neighboring boxes using the iterated rate of change in vorticity with respect to time;

calculating the vorticity and velocity for remaining boxes in accordance with the fast multipole method; and summing the contributions of the directly calculated box vorticities and velocities and the fast multipole method computed box vorticities and velocities.

* * * * *

UNITED STATES PATENT AND TRADEMARK OFFICE
CERTIFICATE OF CORRECTION

PATENT NO. : 5,600,060

DATED : February 4, 1997

INVENTOR(S) : Stephen A. Huyer et al

It is certified that error appears in the above-identified patent and that said Letters Patent is hereby corrected as shown below:

<u>TITLE PAGE ITEM [75]</u>

Change the Inventor(s) from "John R. Grant, Jamestown, R.I." to --Stephen A. Huyer, Portsmouth, R.I.; John R. Grant, Jamestown, R.I.--

ITEM [19]

Change the heading of the Patent underneath United States Patent from "Grant" to Huyer Et Al.--

Signed and Sealed this

Twenty-ninth Day of April, 1997

*Attest:*

*Attesting Officer*

BRUCE LEHMAN

*Commissioner of Patents and Trademarks*